(12) United States Patent
Tsutsumi et al.

(10) Patent No.: US 9,238,496 B2
(45) Date of Patent: Jan. 19, 2016

(54) MOTORCYCLE

(75) Inventors: Yojiro Tsutsumi, Saitama (JP);
Tadatoshi Shigetomi, Saitama (JP);
Mutsumi Katayama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 849 days.

(21) Appl. No.: 11/979,047

(22) Filed: Oct. 30, 2007

(65) Prior Publication Data

US 2008/0128190 A1   Jun. 5, 2008

(30) Foreign Application Priority Data

Nov. 29, 2006   (JP) .................... 2006-321668

(51) Int. Cl.
| | |
|---|---|
| *B62K 11/04* | (2006.01) |
| *G10K 11/178* | (2006.01) |
| *B62J 1/28* | (2006.01) |
| *B62J 3/00* | (2006.01) |
| *H04R 5/02* | (2006.01) |
| *B62J 1/12* | (2006.01) |
| *B60Q 9/00* | (2006.01) |
| *B62K 11/00* | (2006.01) |
| *B60R 16/023* | (2006.01) |

(Continued)

(52) U.S. Cl.
CPC . *B62K 11/04* (2013.01); *B60Q 9/00* (2013.01); *B62J 1/12* (2013.01); *B62J 1/28* (2013.01); *B62J 3/00* (2013.01); *B62K 11/00* (2013.01); *G10K 11/178* (2013.01); *H04R 5/023* (2013.01); *B60N 2002/4485* (2013.01); *B60R 16/0232* (2013.01); *B62K 21/26* (2013.01)

(58) Field of Classification Search
CPC   B62K 11/04; B60R 16/0232; B60R 16/0233; B60R 25/104; G10K 2210/129; G10K 11/1788; G10K 11/178

USPC ............. 180/219; 340/427, 446; 701/301, 31; 381/71.4

See application file for complete search history.

(56) References Cited

U.S. PATENT DOCUMENTS 2,265,729  A  *  12/1941  Hall ............................... 601/104
4,136,685  A  *   1/1979  Ramey ............................ 601/57

(Continued)

FOREIGN PATENT DOCUMENTS

| JP | 3211125 B2 | 7/2001 |
|---|---|---|
| JP | 2005-280487 A | 10/2005 |

(Continued)

*Primary Examiner* — Anne Marie Boehler
*Assistant Examiner* — Maurice Williams
(74) *Attorney, Agent, or Firm* — Birch, Stewart, Kolasch & Birch, LLP

(57) ABSTRACT

Vibration generators are provided on a vehicle to give vibration to the body of an occupant in response to outside information inputted from the outside of the vehicle, or vehicle information outputted from an in-vehicle system. The vibration generators are installed under the seating faces or inside the back of the occupant seats, or in the side wall surface of a fuel tank. The vibration generators are driven by information on predetermined contents among outside information obtained by two-way radio communication with another vehicle using radio communication equipment. The vibration generator provided in the occupant seats can be operated as speaker means producing deep bass sound in response to an audio signal of an in-vehicle audio unit. The resulting configuration enables information to be transmitted to the occupant of the vehicle by vibration given to his/her body, rather than being transmitted audibly or visually.

19 Claims, 7 Drawing Sheets

(51) Int. Cl.
*B62K 21/26* (2006.01)
*B60N 2/44* (2006.01)

(56) References Cited

U.S. PATENT DOCUMENTS

| | | | | |
|---|---|---|---|---|
| 4,326,506 | A * | 4/1982 | Kawabata | 601/57 |
| 4,665,549 | A * | 5/1987 | Eriksson et al. | 381/71.5 |
| 4,731,603 | A * | 3/1988 | McRae et al. | 340/407.1 |
| 4,776,632 | A * | 10/1988 | Akimori et al. | 297/284.9 |
| 4,804,221 | A * | 2/1989 | Saiki | 297/284.9 |
| 4,887,688 | A * | 12/1989 | Horiike et al. | 180/229 |
| 5,027,795 | A * | 7/1991 | Kato | 601/15 |
| 5,320,409 | A * | 6/1994 | Katoh et al. | 297/284.6 |
| 5,321,759 | A * | 6/1994 | Yuan | 381/71.9 |
| 5,602,928 | A * | 2/1997 | Eriksson et al. | 381/71.4 |
| 5,617,315 | A * | 4/1997 | Nakao et al. | 701/36 |
| 5,630,206 | A * | 5/1997 | Urban et al. | 455/456.1 |
| 5,669,818 | A * | 9/1997 | Thorner et al. | 463/30 |
| 5,684,462 | A * | 11/1997 | Gold | 340/576 |
| 5,850,458 | A * | 12/1998 | Tomisawa et al. | 381/71.4 |
| 5,910,993 | A * | 6/1999 | Aoki et al. | 381/71.12 |
| 6,034,594 | A * | 3/2000 | Gray | 340/440 |
| 6,068,339 | A * | 5/2000 | Linzalone | 297/463.1 |
| 6,091,321 | A | 7/2000 | Karell | |
| 6,146,342 | A * | 11/2000 | Glen | 601/61 |
| 6,304,175 | B1 * | 10/2001 | Patrick | 340/475 |
| 6,396,394 | B1 * | 5/2002 | Suzuki et al. | 340/425.5 |
| 7,081,099 | B1 * | 7/2006 | Luo | 601/86 |
| 7,187,274 | B2 * | 3/2007 | Clark | 340/457 |
| 7,311,681 | B1 * | 12/2007 | Vaccarella et al. | 601/46 |
| 7,314,455 | B1 * | 1/2008 | Hill | 601/57 |
| 7,369,042 | B2 * | 5/2008 | Osaka et al. | 340/435 |
| 7,370,887 | B2 * | 5/2008 | Matsuo | 280/804 |
| 7,403,367 | B2 * | 7/2008 | Yasuda et al. | 361/139 |
| 2002/0000340 | A1 * | 1/2002 | Laimbock | 180/219 |
| 2003/0060741 | A1 * | 3/2003 | Park | 601/20 |
| 2003/0213627 | A1 * | 11/2003 | Sonoda | 180/68.3 |
| 2003/0225511 | A1 | 12/2003 | Kushida et al. | |
| 2003/0229447 | A1 * | 12/2003 | Wheatley et al. | 701/300 |
| 2003/0230886 | A1 * | 12/2003 | Yamazaki et al. | 280/801.1 |
| 2004/0086134 | A1 * | 5/2004 | Matsuoka et al. | 381/71.4 |
| 2004/0114768 | A1 * | 6/2004 | Luo et al. | 381/71.4 |
| 2004/0203564 | A1 * | 10/2004 | Ho et al. | 455/404.1 |
| 2004/0256897 | A1 * | 12/2004 | Ziegler | 297/215.12 |
| 2005/0017861 | A1 * | 1/2005 | Hunter | 340/457 |
| 2005/0174223 | A1 * | 8/2005 | Egami et al. | 340/440 |
| 2005/0232435 | A1 * | 10/2005 | Stothers et al. | 381/71.11 |
| 2005/0238179 | A1 * | 10/2005 | Erdmann | 381/71.4 |
| 2005/0265566 | A1 | 12/2005 | Suzuki et al. | |
| 2005/0267674 | A1 * | 12/2005 | Suzuki et al. | 701/200 |
| 2006/0044130 | A1 | 3/2006 | Danowski | |
| 2007/0035420 | A1 * | 2/2007 | Yamada et al. | 341/50 |
| 2007/0050133 | A1 * | 3/2007 | Yoshikawa et al. | 701/209 |
| 2007/0151789 | A1 * | 7/2007 | Bracy et al. | 180/219 |
| 2010/0269625 | A1 * | 10/2010 | Zhang et al. | 74/551.9 |

FOREIGN PATENT DOCUMENTS

| | | |
|---|---|---|
| JP | 3773040 B2 | 2/2006 |
| WO | WO-98/51018 A1 | 11/1998 |

* cited by examiner

MOTORCYCLE

CROSS-REFERENCE TO RELATED APPLICATION

The present application claims priority under 35 U.S.C. §119 to Japanese Patent Application No. 2006-321668, filed Nov. 29, 2006, the entire contents of which are hereby incorporated by reference.

BACKGROUND OF THE INVENTION

1. Field of the Invention

The present invention relates to a motorcycle. More specifically, the present invention relates to a motorcycle having a human-machine interface (HMI) which can transmit outside information and vehicle driving information to an occupant by bodily felt vibration.

2. Description of Background Art

In a vehicle such as a motorcycle, there is known a system which obtains outside information to be noted during running, such as the position of another vehicle and the position of an intersection. For instance, JP Patent Publication No. 3773040 proposes a vehicle recognition support system in which position information of an intersection detected by a main vehicle having a navigation system is transmitted to a sub-vehicle by radio communication and the sub-vehicle receiving the position information warns a rider that the vehicle is approaching the intersection. The warning is performed using an audio receiver arranged in an HUD (Head-Up Display) or helmet.

JP Patent Publication No. 3211125 proposes a motorcycle which has a vibration generator in a grip portion of a handlebar and drives the vibration generator in response to operation of a direction indicator. An occupant identifies that the direction indicator is operated, through vibration transmitted from the grip portion to his/her hands by operation of the vibration generator.

The system described in JP Patent Publication No. 3773040 visually or audibly transmits warning information to the occupant by the audio receiver in the HUD or helmet. It is impossible to continue to monitor the HUD all the time. When the audio receiver receives other information such as music, the warning information interrupts the music information, which can offend the rider's ear. It is considered that the warning information is transmitted to the occupant using the vibration generator in the grip portion described in JP Patent Publication No. 3211125.

In this case, there is a problem to be addressed. As the vibration generator vibrates the grip portion, it is desirable that its vibrational amplitude be small. The small vibrational amplitude is masked in engine vibration or vibration transmitted from a road to the vehicle body and is difficult to be reliably transmitted to the occupant.

An object of the present invention is to provide a motorcycle having a system which can easily transmit outside information and vehicle driving information by bodily felt vibration, not by an HUD or an audio receiver.

SUMMARY AND OBJECTS OF THE INVENTION

The present invention for achieving the object has a first aspect in that a motorcycle has vibration generation means installed under the seating face or inside the back of an occupant seat or in the side wall surface of a fuel tank and giving vibration to the body of an occupant in response to outside information inputted from the outside of a vehicle or vehicle information outputted from an in-vehicle system.

The present invention has a second aspect in that the vibration generation means is driven by information on predetermined contents among outside information obtained by two-way radio communication with another vehicle using radio communication equipment.

The present invention has a third aspect in that the radio communication equipment includes means measuring the distance between a vehicle and another vehicle based on communication with the another vehicle, the motorcycle further includes an inertia guidance system, a GPS receiver, and an optical beacon communication system, and the radio communication equipment detects a self-position based on map information obtained from another vehicle having a navigation system and position information of the another vehicle and drives the vibration generation means using information that the vehicle is approaching within a predetermined distance to a noted position on the map information, as the outside information.

The present invention has a fourth aspect in that a vibration generator is driven by an output signal of an audio unit to generate vibration.

The present invention has a fifth aspect in that the frequency of vibration generated by the vibration generation means is set to 50 hertz or below.

Effects of the invention include the following:

According to the first aspect of present invention, the vibration generator is vibrated by inputted outside information or vehicle information and can transmit the outside information or vehicle information to a rider or passenger on the occupant seat, or a rider knee-gripping the fuel tank by vibration added to his/her body (bodily felt vibration).

According to the second aspect, when information obtained from another vehicle by radio communication is predetermined noted information, the information can be transmitted to the occupant by vibration.

According to the third aspect, information on another vehicle having a navigation system is used to detect a self-position and information that the user vehicle is approaching a predetermined noted position can be transmitted to the vibration generator provided in the occupant seat or the fuel tank.

According to the fourth aspect, the motorcycle without a space for arranging deep bass sound speakers can reproduce a deep bass sound signal outputted from the audio unit.

According to the fifth aspect, vibration is generated in a low frequency range. Various kinds of outside information or vehicle information can be transmitted to the occupant using vibration which can be clearly differentiated from a signal transmitted from an engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
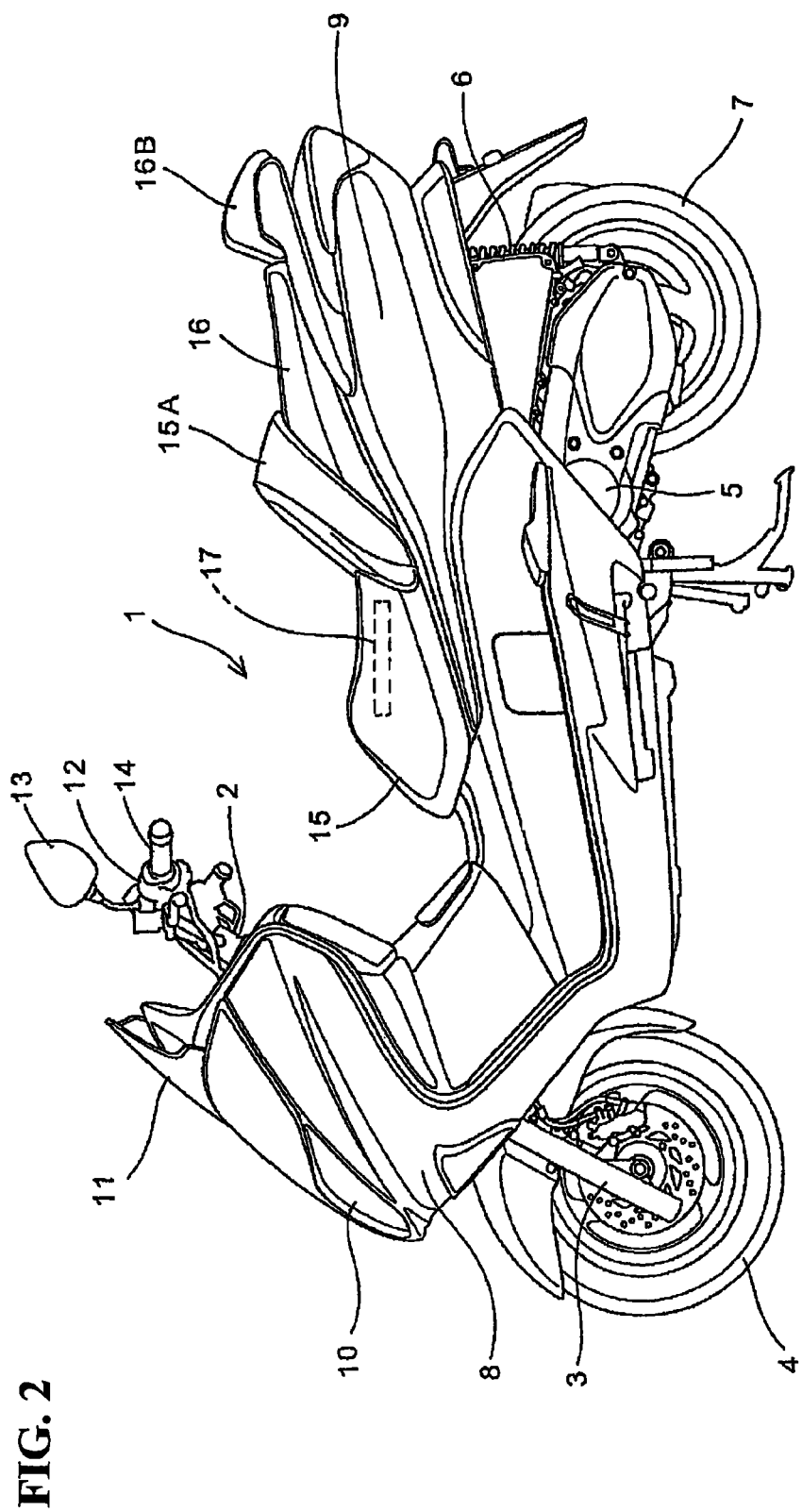
FIG. 2 is a side view of a scooter type motorcycle according to an embodiment of the present invention.

An embodiment of the present invention will be described below with reference to the drawings. FIG. 2 is a side view showing a motorcycle with a bodily felt vibration generator according to an embodiment of the present invention. A motorcycle 1 shown in FIG. 2 is a scooter type vehicle. A front fork 3 coupled to a steering shaft 2 and the lower portion of the steering shaft 2 and extended diagonally forward and downward is provided in the forwardmost portion of a vehicle body frame, not shown. A front wheel 4 is pivotally mounted on the front fork 3. One end of a power unit 5 including an engine and a transmission is swingably pivotally mounted on the vehicle body frame, not shown. The rear portion of the power unit 5 is coupled to the rear portion of the vehicle body frame by a rear cushion 6. A rear wheel 7 is attached to an output shaft (not shown) of a decelerator of the power unit 5.

The substantially entire vehicle body frame is covered by a front cowl 8 and a rear cowl 9. A headlight 10 is embedded in the forwardmost portion of the front cowl 8. A rearward tilted wind screen 11 is erected in the upper portion of the front cowl 8. A handlebar 12 coupled to the upper portion of the steering shaft 2 is provided with a sideview mirror 13 and a grip 14. A rider seat 15 is arranged in the substantially center portion in the front and rear directions of the vehicle body. A pillion 16 is provided rearward of the rider seat 15.

A vibration generator 17 giving vibration to the seating face of the rider seat 15 is mounted on the bottom plate (described later) of the rider seat 15.

Figure 1:
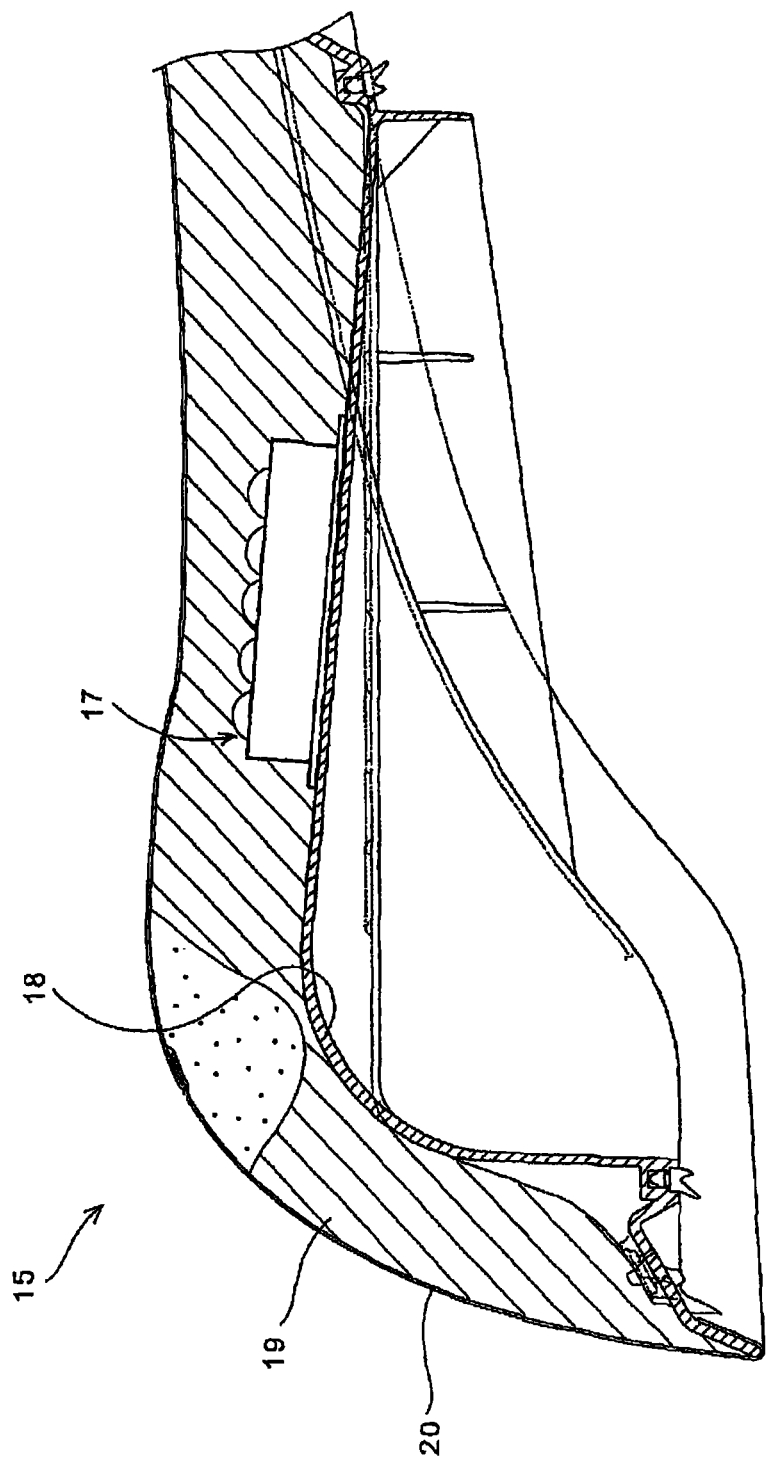
FIG. 1 is a cross-sectional view of a rider seat of a motorcycle having a vibration generator according to an embodiment of the present invention.

FIG. 1 is a cross-sectional view of the rider seat 15 into which the vibration generator 17 is incorporated. In FIG. 1, the rider seat 15 has a bottom plate 18, a cushion member 19 molded by a urethane foam, and a seat cover 20 covering the cushion member 19. The vibration generator 17 is mounted on the bottom plate 18.

Figure 3:
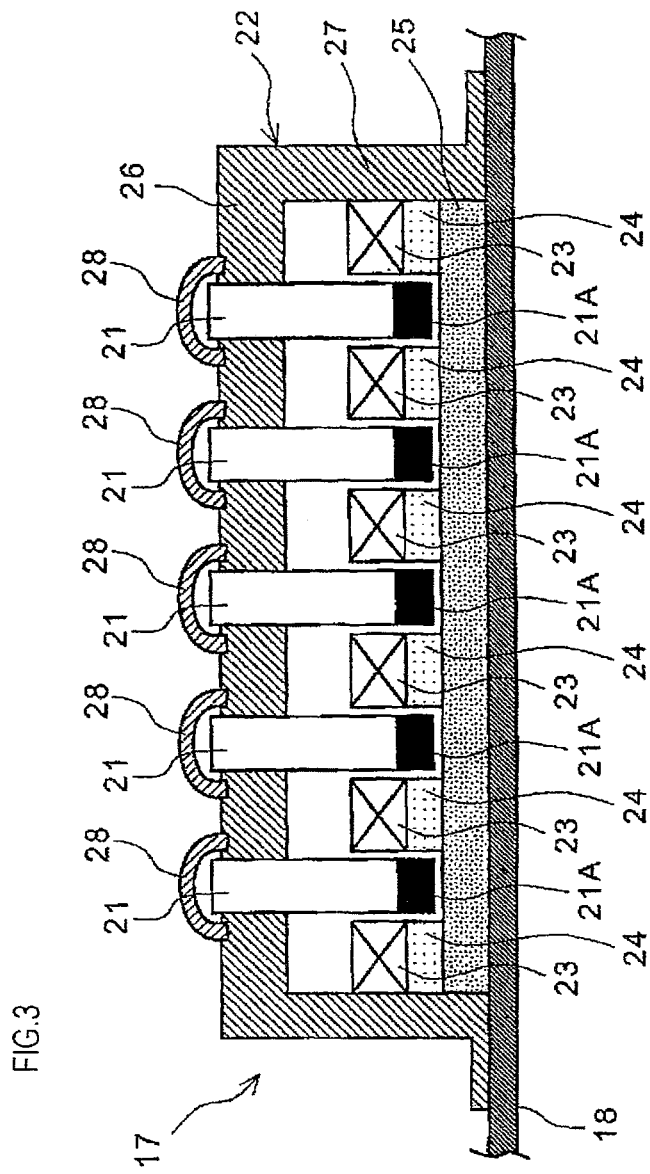
FIG. 3 is a system block diagram of a motorcycle according to an embodiment of the present invention.

FIG. 3 is a cross-sectional view schematically showing an example of a specific constitution of the vibration generator 17. The vibration generator 17 has plural (in this example, five) pillar-shaped movable members 21, a housing 22 supporting the movable members 21, and solenoids 23 arranged so as to surround the movable members 21. Lower ends 21A of the movable members 21 are magnetic substances. The solenoids 23 are mounted over a vibration generator base 25 via spacers 24. The vibration generator base 25 is fixed onto the bottom plate 18. The housing 22 has a body portion 26 slidably supporting the movable members 21 in the vertical direction in the drawing, and a skirt portion 27 extended downward from the body portion 26 and connected to the bottom plate 18. The body portion 26 is provided with partially spherical flexible members 28 made of an elastic material such as rubber in the positions corresponding to the movable members 21 protruded upward from the body portion 26. The flexible members 28 may be made of a member different from the body portion 26 of the housing 22 and be adhered onto the body portion 26 by an adhesive. The body portion 26 and the flexible members 28 may be formed integrally by an elastic material.

When the solenoids 23 of the vibration generator 17 are energized, the magnetic substances constituting the lower ends 21A of the movable members 21 are attracted by the action of a magnetic field generated by the solenoids 23 and the movable members 21 are then displaced upward. The flexible members 28 are pushed up by the movable members 21 so as to be deformed. When energization to the solenoids 23 is stopped, the movable members 21 are displaced downward by a return force of elasticity of the flexible members 28 so as to be returned to the original positions. Energization to the solenoids 23 is performed by a predetermined duty, whereby the movable members 21 are continuously reciprocated to vibrate the flexible members 28. The vibration is transmitted to the hips of the rider via the seat cover 20 of the rider seat 15.

Figure 4:
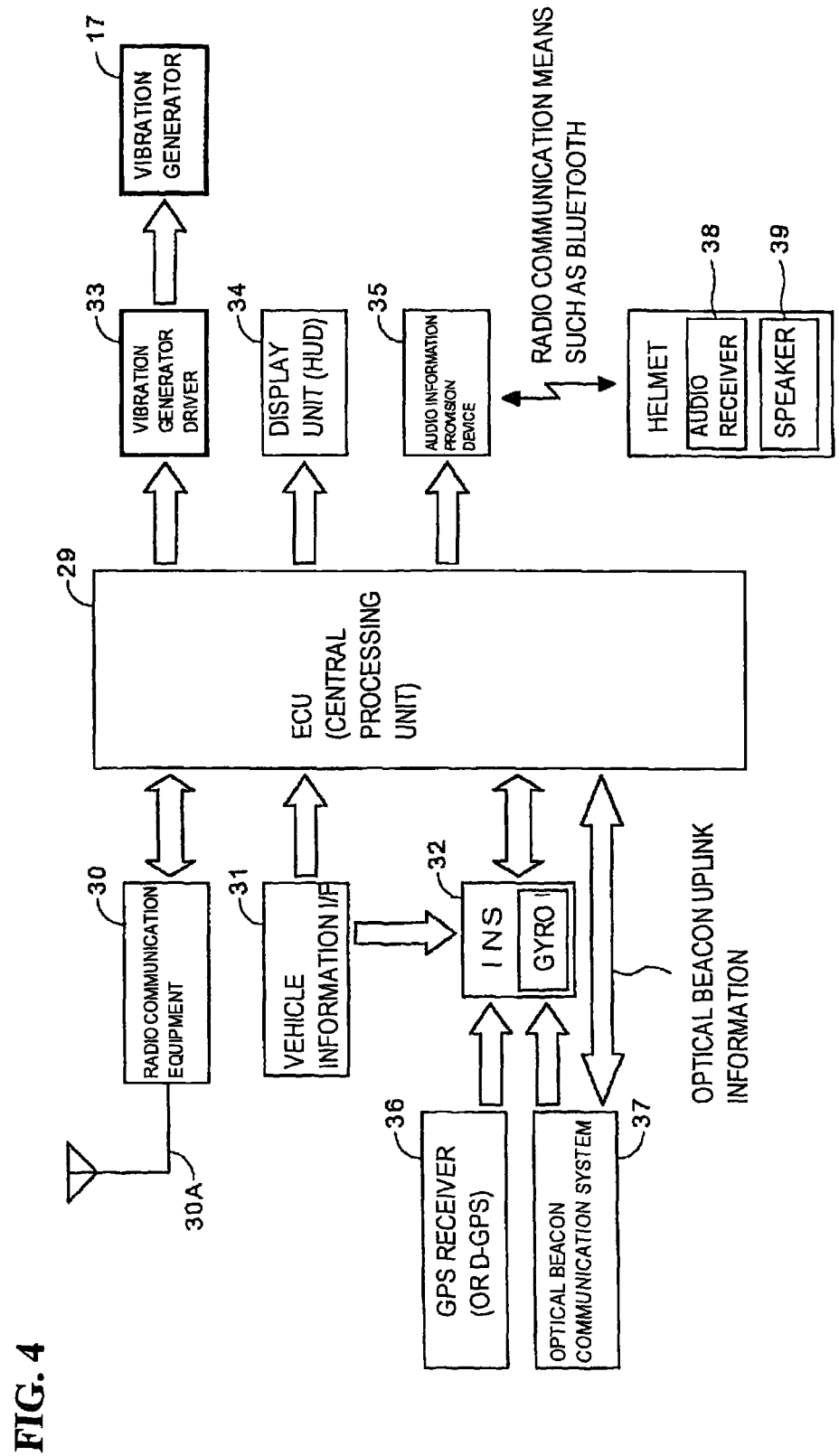
FIG. 4 is a system block diagram of the essential parts of the motorcycle including the vibration generator according to an embodiment of the present invention.

An application example of the vibration generator 17 will be described specifically. FIG. 4 is a system block diagram of the essential parts of the motorcycle including the vibration generator 17. In FIG. 4, a central processing unit (ECU) 29 is connected to radio communication equipment 30, a vehicle information interface 31, an inertia guidance system (INS) 32, a vibration generator driver 33, a display unit 34, and an audio information provision device 35. An output of the vibration generator driver 33 is connected to the vibration generator 17. The INS 32 is connected to a GPS receiver 36 and an optical beacon communication system 37. The audio information provision device 35 provides audio information by an audio receiver 38 and speakers 39 provided in a helmet worn by the rider using radio communication means such as Bluetooth. For instance, it is preferable that the display unit 34 be constituted by the HUD projecting an image onto the wind screen 11.

The radio communication equipment 30 can establish a communication link with another vehicle by the spread spectrum (SS) communication method and the time-division multiplex method. The radio communication equipment 30 has a distance measurement function executing communication with another vehicle via an SS communication antenna 30A to measure a relative distance between a vehicle and another vehicle communicated therewith. The vehicle information interface 31 collects vehicle information such as the vehicle speed, the acceleration and deceleration, and the running distance of the motorcycle 1 in a predetermined cycle to supply the information to the ECU 29 and the INS 32. DSRC (Dedicated Short Range Communication) which is widely spreading in an ETC may be applied to the radio communication equipment 30.

The GPS receiver 36 may be a D-GPS measuring a position based on plural GPS electric waves. The INS 32 calculates a direction and a traveling distance by a direction detected by a gyro and an acceleration detected by an accelerometer. The calculated results are corrected by position information obtained by the GPS electric waves and the optical beacon communication system 37. The ECU 29 transmits UpLink information via the optical beacon communication system 37.

Figure 5:
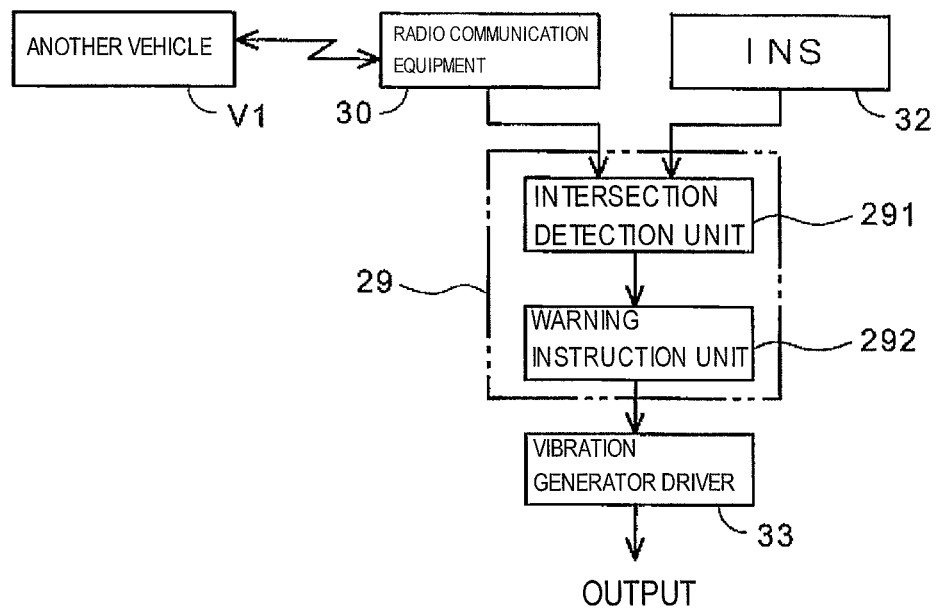
FIG. 5 is a block diagram showing the essential part functions of an ECU provided in a motorcycle according to an embodiment of the present invention.

FIG. 5 is a block diagram showing the essential functions of the ECU 29. The ECU 29 has an intersection detection unit 291 detecting that the user vehicle is approaching an intersection, based on position information of the intersection received via another vehicle V1 or the optical beacon by the radio communication equipment 30 and the position of the user vehicle (motorcycle) 1 based on information inputted from the INS 32. Here, the another vehicle V1 is assumed to be a vehicle having a navigation function and a function transmitting the coordinates of the intersection, the running position vector, and the current position present within a predetermined range to all vehicles in which the communication link with the vehicle V1 is established. Such vehicle is disclosed in JP Patent Publication No. 3773040.

The intersection detection unit 291 precisely specifies the current position of the user vehicle based on the position measured results of the INS 32, the current position of the vehicle V1, and the relative distance between the user vehicle and the vehicle V1 to determine the running position vector of the user vehicle. The intersection the user vehicle is approaching is identified based on the running position vector of the user vehicle and the coordinates of the intersection. A warning instruction unit 292 receives intersection identification information from the intersection detection unit 291 and then inputs, to the vibration generator driver 33, an instruction warning that the user vehicle is approaching the intersection. The vibration generator driver 33 intermittently supplies an electric current from a battery, not shown, by a predetermined duty to the vibration generator 17 according to the instruction. The vibration generator 17 operates the movable members 21 by intermittent supply of the electric current to generate vibration.

The duty of electric current supply to the vibration generator 17 is controlled to vary the vibration frequency according to information to be transmitted. An alternate current at a constant frequency may be simply supplied to generate vibration at a constant frequency.

In general, the vehicle body vibration of the motorcycle is determined by engine vibration. The vibration frequency is often hundreds of hertz to several kilohertz. The vibration frequency of the vibration generator 17 is set in a range from several to tens of hertz (preferably, 10 to 50 hertz). The vehicle body vibration can be easily discriminated from the vibration of the vibration generator 17. The information to be transmitted to the rider can be transmitted precisely with good timing.

The vibration generator 17 is energized so that the magnetic substances 21A of the movable members 21 are moved toward the solenoids 23. The amount of movement, that is, the vibrational amplitude of the movable members 21 can be determined based on the extent to which the displacement of the magnetic substances 21A and the solenoids 23 is set when the movable members 21 are in the lowermost position.

The vibration generator 17 vibrates the rider seat 15 in the vertical direction. The rider can sense the vibration on his/her hips during running to easily receive warning information. The warning information may only be directly transmitted as a feeling in the body, obtained by directly stimulating the body (hips) of the rider by vibration of the vibration generator 17. A visual or audible method via the display unit 34 or the audio information provision device 35 may be used together.

One vibration generator 17 is provided in the rider seat 15 to vibrate the entire rider seat 15, which is not limited. For instance, the rider seat 15 may be divided into right and left regions to arrange one vibration generator 17 in each of the regions. It is thus possible to previously set a vibration transmission mode of whether one or both of the two vibration generators 17 are to be driven according to the type of information to be transmitted or the emergency degree. The type of information or the emergency degree can be transmitted to the rider more easily.

As shown in FIG. 3, the vibration generator 17 is provided with a row of the flexible members 28. Without being limited to this, plural rows of the flexible members 28 may be arrayed in a planar wide range. For instance, an application in which information to be transmitted is discriminated depending on which region of the movable members 21 is driven is considered. Generally, hips are not sensitive to the extent of properly identifying which of the flexible members 28 is moved up and down in a narrow region. When the flexible members 28 are distributed in a wide range, even an equal number of the flexible members 28 can eliminate variation in sensitivity due to the difference in physique between individual riders and information can be transmitted precisely.

In the above embodiment, the warning information from communication of the vehicles that the user vehicle is approaching the intersection is transmitted to the rider by the vibration generator 17. The vibration generator 17 is not limited to this and can be used for transmitting various kinds of outside information or vehicle information to the occupant. For instance, in place of transmission of the operation of the direction indicator of the vehicle described in Patent Document 2, more effective information transmission can be performed. In this case, the vibration generators 17 provided on the right and left sides of the rider seat 15 can be selectively driven corresponding to the operating one of the right and left direction indicators.

When the amount of residual fuel is smaller than a predetermined value to give a warning or a vehicle speed is higher than a predetermined value to give an over-speed warning, the vibration generator 17 may be driven.

Figure 6:
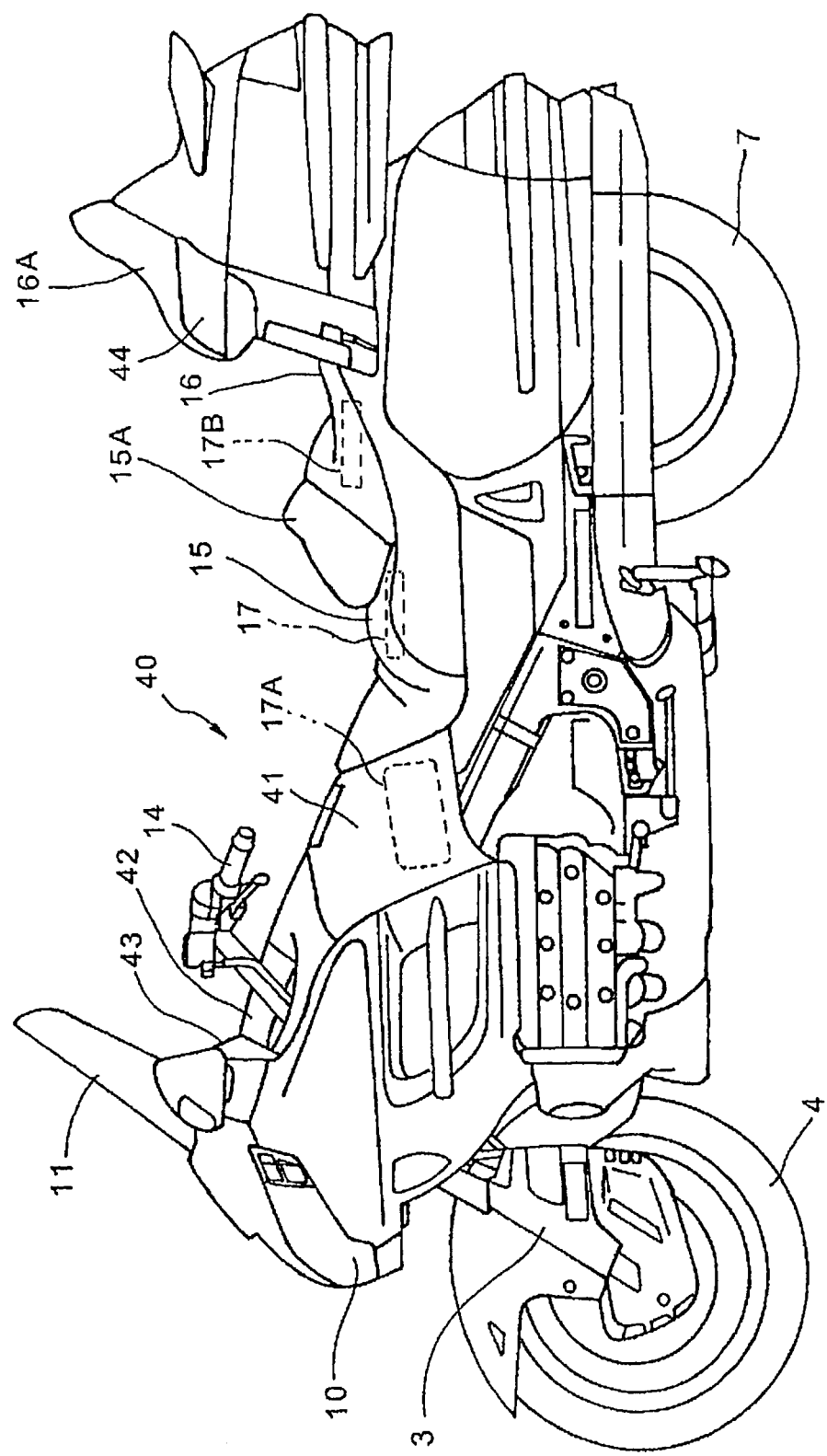
FIG. 6 is a side view of a large motorcycle according to an embodiment of the present invention.

A second embodiment of the present invention will be described. FIG. 6 is a side view of a large motorcycle into which the vibration generator is incorporated. In FIG. 6, a large motorcycle 40 has entirely the same constitution as the scooter type motorcycle 1 of FIG. 2 and the same or equivalent portions are indicated by similar reference numerals. The rider seat 15 is arranged in the center portion of the vehicle body. The pillion 16 is arranged rearward of the rider seat 15. A fuel tank 41 is provided forward of the rider seat 15. The large motorcycle 40 has an audio unit in addition to the motorcycle 1. An audio unit body (audio unit) 42 is provided forward of the fuel tank 41. Speakers 43 of the audio unit are arranged on the right and left sides of a meter unit having a speedometer and a rotating meter. Rear speakers 44 connected to the audio unit are arranged on the right and left sides of the back 16A of the pillion 16.

The vibration generator 17 is incorporated into the rider seat 15. Vibration generators 17A are provided in the right and left side wall portions of the fuel tank 41. When the rider takes the rider seat 15 to take a driving posture in the knee-gripping state sandwiching the fuel tank between the inner sides of both legs, the vibration generators 17A are positioned such that vibration generated by the vibration generators 17A is transmitted to the rider. A vibration generator 17B is arranged just under the seating face of the pillion 16. The vibration generators 17A and 17B may be of the same constitution as the vibration generator 17 and can also be modified.

Figure 7:
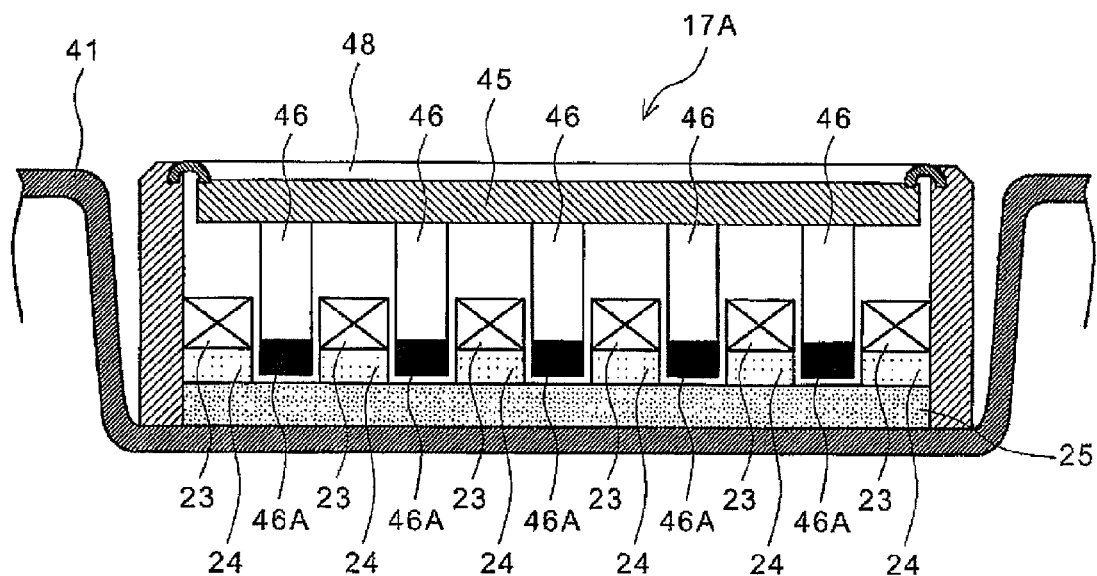
FIG. 7 is a cross-sectional view showing a modification example of a vibration generator provided in a motorcycle according to an embodiment of the present invention.

FIG. 7 is a cross-sectional view according to a modification example of the vibration generator 17A (ditto for 17 and 17B). The same reference numerals as FIG. 3 denote similar or equivalent portions. In FIG. 7, plural movable portions 46 coupled to and integrally formed on a vibration generator surface member 45. The movable portions 46 have magnetic substances 46A similar to the magnetic substances 21A of the movable members 21. The vibration generator surface member 45 is a portion opposite the legs of the rider in the case of the vibration generator 17A and may be formed by an elastic body material such as rubber. The vibration generator surface member 45 is surrounded by a housing side wall 47 and both are connected by a flexible member 48. The flexible member 48 is desirably a member of an entirely annular shape (a rectangular annular shape when the housing side wall is rectangular) having a semicircular sectional shape as shown and may be small pieces which can be distributed and arranged in plural positions.

In the constitution of FIG. 7, when the solenoids 23 are energized, the magnetic substances 46A of the movable portions 46 are attracted by the solenoids 23 so as to be displaced in the direction moving away from the fuel tank 41. The vibration generator surface member 45 coupled to the movable portions 46 deforms the flexible members 48 so as to be displaced in the same direction. When energization to the solenoids 23 is stopped, the restoring force of the deformed flexible members 48 displaces the vibration generator surface member 45 to the fuel tank 41 side so as to be returned to the lower position. Energization and stop of energization to the solenoids 23, that is, cyclic energization vibrates the vibration generator surface member 45. This vibration is transmitted to the legs of the knee-gripping rider as a feeling in the body and information is transmitted to the rider using the vibration as a medium.

Information transmitted by vibration of the vibration generators 17A and 17B may be the same as the above-described outside information or vehicle information for the vibration generator 17 or may be other information.

In the large motorcycle 40 having the audio unit, the vibration generator 17B provided in the pillion 16 may be used as an audio reproducer of the audio unit for reproducing deep bass sound. It has been difficult to secure a space for installing speakers (woofers) suitable for reproducing sound in the deep bass sound range by the audio unit in the motorcycle. The vibration generator 17B is therefore replaced with the speakers for the deep bass sound range to eliminate the difficulty in securing the space. The vibration frequency of the vibration generator 17B is 50 hertz or below, which is the range of the lower limit of the audible frequency of a human. Vibration at this frequency can be directly transmitted to the body of the occupant.

The vibration generator 17B can reproduce deep bass sound of the audio unit as well as the outside information or vehicle information. Even without improving the deep bass sound reproduction function of the speakers for audio reproduction or increasing the entire volume, rich deep bass sound can be felt in the body. The marketability of the large motorcycle can be enhanced. Vibration sound of the vibration generator 17 is hardly heard by a human outside the vehicle. The occupant can enjoy reproduced sound of the audio unit without worrying about sound leak to outside.

The above embodiments show examples of the present invention and the present invention is not limited to this. For instance, the installed position of the vibration generator can be arbitrarily selected as long as it is a place in which the occupant can feel vibration to the body, not audibly or visually. For instance, the vibration generator may be provided in a waist support 15A of the rider seat 15 or the back portion 16A of the pillion 16 (or a waist support 16B of FIG. 2).

The constitution of the vibration generator is not limited to that shown in FIGS. 3 and 7 and various constitutions generating vibration by an electromagnetic method is applicable.

The quality of material of the surface member of the vibration generator 17, that is, the member opposite the hips or the inner sides of legs can be a flexible material. Its shape can be a smoothly rounded outer shape.

The vibration generator generates vibration in opposite phase of vibration of a vehicle body frame by vibration from an internal combustion engine and may be used as a device reducing vibration to the occupant. Vibration can be made smaller during normal running so that vibration at giving a warning can be easily felt.

In the example of JP Patent Publication No. 3211125, vibration is given to the grip. Vibration felt can be changed by the operation state during driving. In the present invention having the vibration generator in the seat, the rider is often contacted with it in the same state all the time. Information can be transmitted more easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
a first vibration generator mounted on an upper right region of an upwardly facing surface of a seat bottom plate of an occupant seat,
a second vibration generator mounted on an upper left region of the upwardly facing surface of the seat bottom plate of the occupant seat,
the first and second vibration generators are directly mounted on the upwardly facing surface of the seat bottom plate and extend lengthwise in a front-to-rear direction along the seat bottom plate of the occupant seat, so that long sides of the first and second vibration generators extend parallel to each other, and
driver means capable of selectively driving either one of, or both of, the first and second vibration generators in an upward direction in response to at least one of inputted outside information and vehicle information detected by an in-vehicle system to generate a vibration,
wherein each of the first and second generators includes a housing with a body portion slidably supporting a plurality of magnetic movable members in a vertical direction, and a skirt portion extended downward from the body portion and connected to the seat bottom plate,
wherein the body portion is provided with partially spherical flexible members made of an elastic material in positions corresponding to one or more of the movable members protruding upward through holes in the upper surface of the body portion,
wherein the flexible members are made of a member different from the body portion of the housing and are adhered onto the body portion by an adhesive.

2. The motorcycle according to claim 1,
wherein the motorcycle further comprises:
a power unit including an engine and a transmission;
a seat cover and a cushion member are installed over the seat bottom plate, including the first and second vibration generators mounted respectively in the right and the left regions of the upwardly facing portion of the seat bottom plate of the occupant seat, and
a waist support slanting rearwardly and upwardly in a position behind the seat bottom plate, the waist support being arranged directly above the power unit, wherein each of the first and second vibration generators also include solenoids arranged so as to surround the movable members,
lower ends of the movable members are magnetic substances, and
the solenoids are mounted over a vibration generator base via spacers, the vibration generator base being fixed onto the seat bottom plate.

3. The motorcycle according to claim 1,
wherein the first and second vibration generators installed in the right and left regions of the occupant seat are capable of being selectively driven by different operating conditions of the motorcycle.

4. The motorcycle according to claim 1, further comprising radio communication equipment,
wherein the outside information is information on predetermined contents among information obtained by two-way radio communication with another vehicle.

5. The motorcycle according to claim 4,
wherein the radio communication equipment includes means measuring the distance between the motorcycle and the another vehicle based on communication with the another vehicle;
the motorcycle further comprising:
an inertia guidance system, a GPS receiver, and an optical beacon communication system; and
the radio communication equipment detects a self-position based on map information obtained from the another vehicle having a navigation system and position information of the another vehicle and drives one or both of the first and second vibration generators using information that the vehicle is approaching within a predetermined distance to a noted position on the map information, as the outside information.

6. The motorcycle according to claim 4,
wherein the radio communication equipment includes means measuring the distance between the motorcycle and the another vehicle based on communication with the another vehicle.

7. The motorcycle according to claim 6, further comprising:
an inertia guidance system, a GPS receiver, and an optical beacon communication system; and
wherein the radio communication equipment detects a self-position based on map information obtained from the another vehicle having a navigation system and position information of the another vehicle and drives one or both of the first and second vibration generators using information that the vehicle is approaching within a predetermined distance to a noted position on the map information, as the outside information.

8. The motorcycle according to claim 1,
wherein a frequency of the vibration generated by at least one of the first and second vibration generators is set to 50 hertz or below.

9. The motorcycle according to claim 1,
wherein a frequency of the vibration generated by each of the first and second vibration generators is set to 50 hertz or below.

10. The motorcycle according to claim 1,
wherein each of the first and second vibration generators includes a housing lengthwise in a front-to-rear direction along the seat bottom plate of the occupant seat containing multiple solenoid-driven movable members, and
wherein each of the movable members is adapted to give the vibration to the right and left regions of the body of the occupant via a flexible member on an outer surface of the housing.

11. The motorcycle according to claim 1, further comprising:
an audio unit provided in a forward portion of the motorcycle;
a pillion provided directly rearward of a waist support;
a third vibration generator arranged just under a seating face of the pillion.

12. The motorcycle according to claim 11,
wherein a frequency of the vibration generated by the first, second, and third vibration generators is set to 50 hertz or below.

13. The motorcycle according to claim 11,
wherein each of the first, second, and third vibration generators is activated by operating information of the motorcycle.

14. The motorcycle according to claim 11,
wherein each of the first, second, and third vibration generators is activated by information from outside of the motorcycle.

15. A motorcycle, comprising:
vibration generation means installed giving vibration to a body of an occupant; and
driver means driving the vibration generation means in response to at least one of inputted outside information and vehicle information detected by an in-vehicle system to generate vibration,
wherein the vibration generation means is installed in a recess of a side wall surface of a fuel tank arranged forward of an occupant seat, and includes a flat vibration generator surface member capable of giving the vibration to the body of the occupant.

16. The motorcycle according to claim 15, further comprising a housing which is disposed in the recess in the side wall surface of the fuel tank for containing the vibration generation means,
wherein a perimeter of the flat vibration generator surface member is surrounded by a side wall of the housing.

17. The motorcycle according to claim 16,
wherein the vibration generation means includes a plurality of solenoids capable of generating the vibration on a back surface of the flat vibration generator surface member.

18. The motorcycle according to claim 15,
wherein the vibration generation means generates the vibration with a phase that is opposite to a phase of a vibration of a motorcycle body by vibration from an internal combustion engine, wherein the vibration generation means is capable of reducing vibration from the engine to the occupant.

19. The motorcycle according to claim 15,
wherein a frequency of the vibration generated by the vibration generation means is set to 50 hertz or below.

* * * * *